United States Patent [19]

Zygutis et al.

[11] Patent Number: 5,037,038

[45] Date of Patent: Aug. 6, 1991

[54] DUAL MODE SEAT BELT RETRACTOR

[75] Inventors: James L. Zygutis, Frankfort, Ill.; Gerald A. Doty, Crown Point, Ind.

[73] Assignee: Occupant Safety Systems, Inc., Olympia Fields, Ill.

[21] Appl. No.: 477,595

[22] Filed: Feb. 9, 1990

[51] Int. Cl.$^5$ .............................................. B60R 22/40
[52] U.S. Cl. ....................... 242/107.4 A; 242/107.4 R
[58] Field of Search ............... 242/107.4 A, 107.4 B, 242/107.4 R, 107.4 D; 280/806; 297/478

[56] References Cited

U.S. PATENT DOCUMENTS

| | | | |
|---|---|---|---|
| 4,327,882 | 5/1982 | Frankila et al. | 242/107.4 A |
| 4,518,132 | 5/1985 | Schmidt | 242/107.4 A |
| 4,552,319 | 11/1985 | Gavagan et al. | 242/107.4 A |
| 4,566,649 | 1/1986 | Petersen, III | 242/107.4 A |
| 4,573,646 | 3/1986 | Willey | 242/107.4 A |
| 4,603,819 | 8/1986 | Loose et al. | 242/107.4 A |
| 4,767,082 | 8/1988 | Schmidt et al. | 242/107.4 A |
| 4,817,885 | 4/1989 | Matsumoto | 242/107.4 A |

Primary Examiner—John M. Jillions
Attorney, Agent, or Firm—Fitch, Even, Tabin & Flannery

[57] ABSTRACT

An inertia retractor may be provided with an automatic locking mode by the addition of an assembly mounted as an attachment to sidewall of the inertia retractor. The assembly allows the retractor to be used as an inertia retractor until the belt is pulled to a predetermined extent whereupon a belt coil sensor senses this predetermined belt extraction and operates an actuator to shift a pawl into locking engagement with the ratchet wheels and thereby into the automatic locking mode. When the belt rewinds, the belt coil sensor deactivates the ALR mechanism by latching the pawl actuator thereby allowing an inertia member to again operate the pawl to the locking position upon a deceleration of sufficient magnitude.

17 Claims, 6 Drawing Sheets

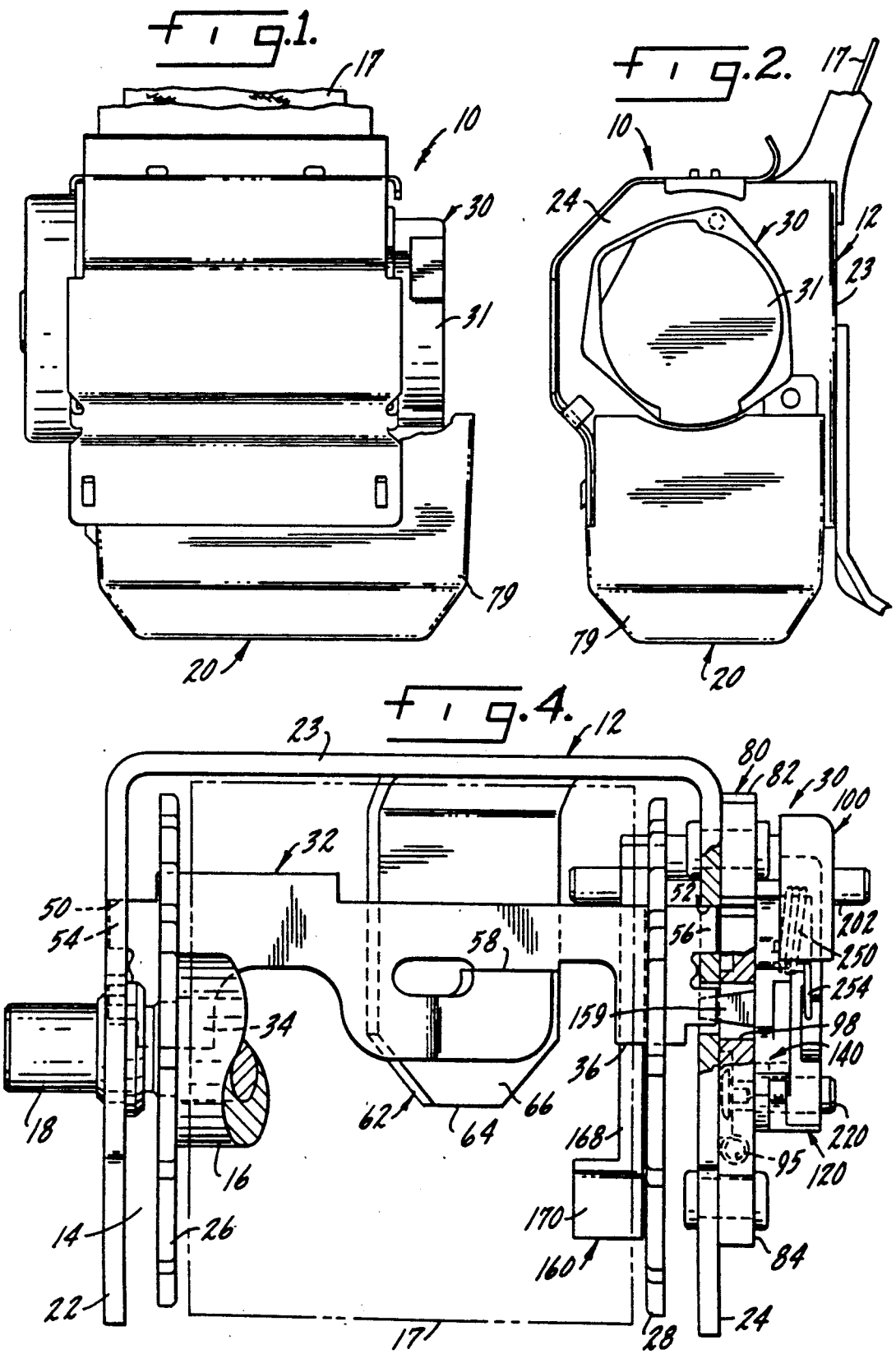

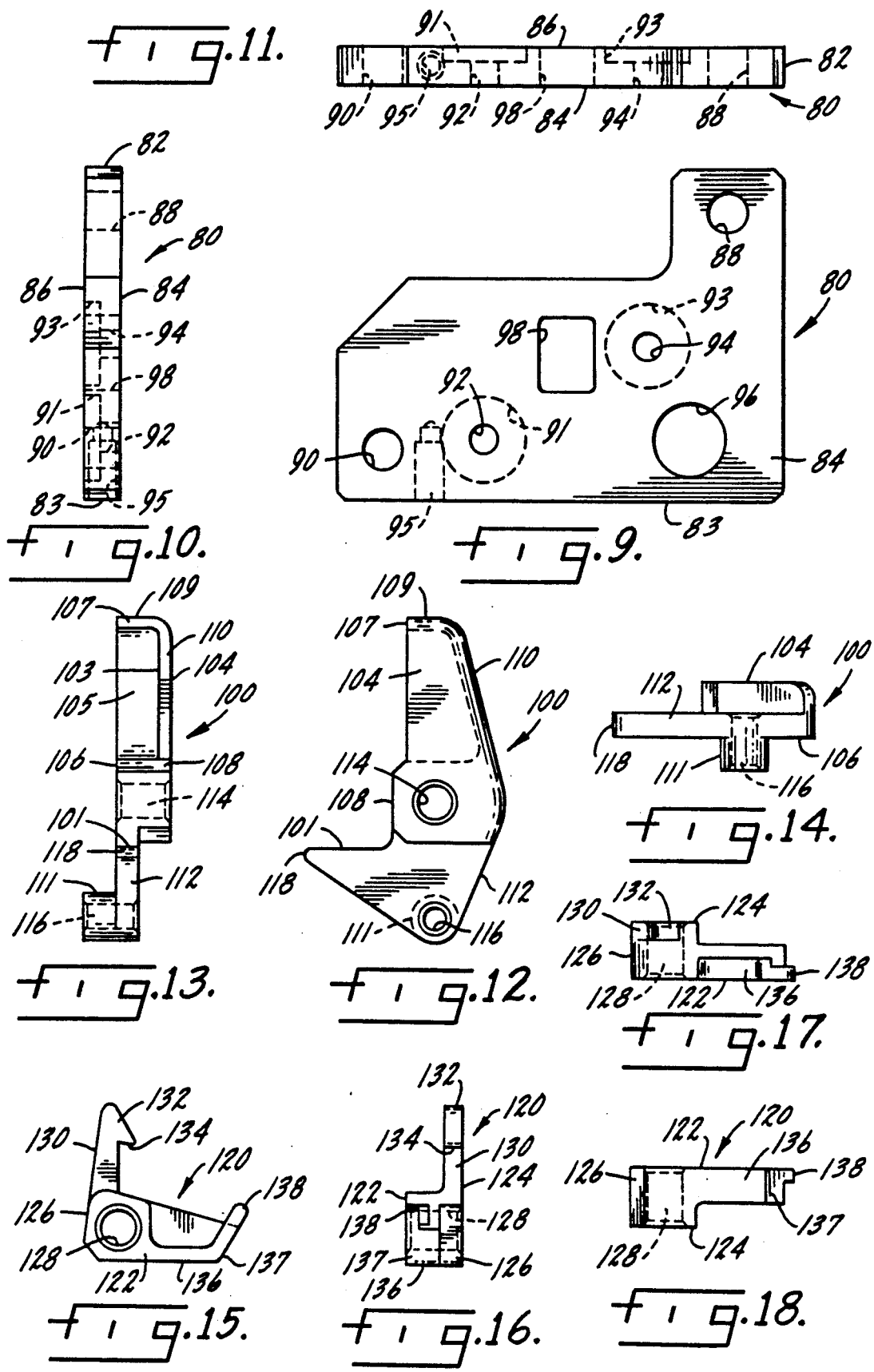

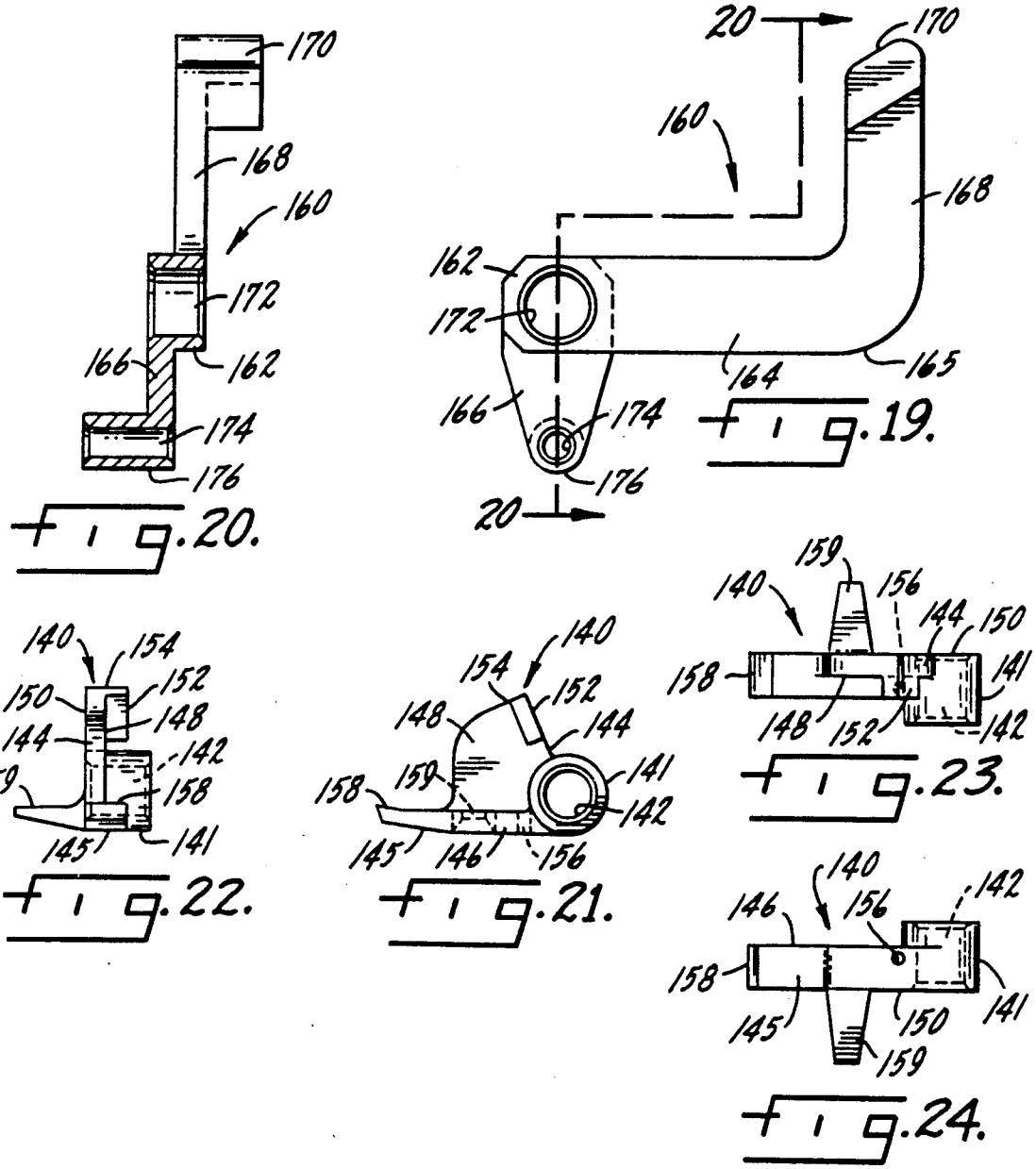

5,037,038

DUAL MODE SEAT BELT RETRACTOR

BACKGROUND OF THE INVENTION

The present invention relates to a vehicle seat belt retractor and more particularly, to such a retractor which may be used either as an inertia-operated locking retractor or an automatic locking retractor (ALR retractor).

When the seat belt retractor is in the inertia-operated mode, the seat belt is unrestrained against protraction by the seat occupant until the inertia member moves at the time of a sudden deceleration to actuate a locking pawl or bar into locking engagement with ratchet wheels on a retractor reel. The reel is locked and no further belt protraction is possible. Thus, the retractor is locked only at the time of an inertia event of sufficient magnitude to cause the locking. On the other hand, the automatic locking retractor is normally locked when positioned about an object or a person on a seat such that no further belt protraction is possible. The usual operation in an ALR retractor is that the seat occupant pulls the belt about one's self and inserts the tip or tongue plate into the seat buckle and releases the grip on the tip whereupon the seat belt is retracted slightly as the belt becomes cinched tight about the occupant. This sequence of actions cause the lock bar to be actuated into locking engagement with the ratchet wheels and to remain so locked until the tip is unbuckled and the belt is allowed to rewind onto the reel.

In addition to protection of seat occupants, the ALR retractor is especially useful to lock baby seats or objects against shifting on the vehicle seats. More specifically, the belt is pulled about the baby seat or an object on the seat and buckled and the belt rewinds slightly to cinch tightly; then the retractor is locked automatically and remains locked against further belt protraction until the seat belt is unbuckled. Thus, the baby seat, object or person is continually cinched tightly with the automatic seat belt retractor and hence, is not able to shift or otherwise it might move as if it were being held by an inertia retractor or in the inertia retractor mode of a convertible retractor.

There is a particular interest today in having seat belt retractors, particularly for rear seats of automobiles, to be convertible between an inertia-locking mode and an ALR mode. When a person is in the rear seat, the person will usually prefer the inertia-operated mode allowing the person freedom of movement until the inertia member is operated to lock the retractor. When a baby seat is placed on the rear seat, the retractor will be converted to the ALR mode to lock the retractor and the baby seat in position initially and then to remain in this locked, cinched position so that the baby seat will not shift on the rear seat.

Convertible seat belt retractors are well known in the art, e.g., U.S. Pat. Nos. 4,552,319; 4,566,649; 4,573,646; 4,327,882; 4,817,885; 4,767,082 and 4,519,132. In these patents, the conversion is made from the inertia mode to the ALR mode by pulling the belt from the reel for a predetermined length of belt, this usually being substantially all of the belt on the reel. A belt or spool diameter sensor determines when the belt is unwound sufficiently to actuate the ALR mechanism to become effective and to render the inertia mechanism ineffective. Various constructions of retractors have been made to be convertible; but often the designs are complex and inexpensive or not easily operated by user between modes. Size is another factor, since the convertible seat belt retractor may be so large that it cannot be used relatively interchangeable with the usual inertia-operated retractor, which may be of a substantially smaller size.

SUMMARY OF THE INVENTION

In accordance with the present invention, a normal size and normal operating inertia-actuated retractor may be fitted with a small attachment or subassembly which will perform the ALR function when the retractor is converted from the inertia-operated mode to the ALR mode, such as by pulling most of the belt from the retractor reel. That is a conventional inertia retractor may have a simple attachment added thereto to add the ALR feature to the inertia-operated retractor. The preferred attachment is attached to an inertia retractor sidewall and when so attached, positions a belt coil sensor to engage the belt coil to sense a change in size thereof. The belt sensor operates a deactivating means in the form of a latch means which, when unlatched, allows a pawl actuating means to shift a pawl or lock bar into latching with the ratchet wheels to lock the belt reel against further belt unwinding rotation. The belt coil sensor senses the belt coil when the belt is subsequently rewound and causes the deactivating means to latch the pawl actuating means whereby the retractor is returned to its inertia-actuated mode. Without the subassembly, the inertia-actuated retractor performs as usual; and it continues to operate in this usual manner even after attachment of the subassembly, until the belt is substantially unwound to convert the retractor from the inertia mode to the ALR mode.

BRIEF DESCRIPTION OF THE DRAWINGS

In the Figures of the drawing, like reference numerals identify like components, and in the drawing:

FIG. 1 is a plan view of a retractor assembly with a manually-operable, automatic-locking subassembly;

FIG. 2 is a side elevational view of the retractor assembly and automatic-locking mechanism;

FIG. 4 is a bottom plan view of the automatic-locking mechanism and reel assembly in partial section;

FIG. 9 is an enlarged side view of the locking mechanism support;

FIG. 10 is an end view of the support of FIG. 9;

FIG. 11 is a plan view of the support of FIG. 9;

FIG. 12 is an elevational view of the actuator arm of the automatic locking mechanism;

FIG. 13 is a side elevational view of the actuator arm of FIG. 12;

FIG. 14 is a top plan view of the actuator arm in FIG. 12;

FIG. 15 is an elevational view of the latch lever of the automatic-locking mechanism;

FIG. 16 is a side view of the latch lever of FIG. 15;

FIG. 17 is a top plan view of the latch lever in FIG. 15;

FIG. 18 is a bottom plan view of the latch lever of FIG. 15;

FIG. 19 is an elevational view of the follower arm of the automatic-locking mechanism;

FIG. 20 is a side view in section of the follower arm of FIG. 19 as taken on line 20—20;

FIG. 21 is an elevational view of the pawl-lifter of the automatic-locking mechanism;

FIG. 22 is a side view of the pawl-lifter of FIG. 21;

FIG. 23 is a top plan view of the pawl-lifter of FIG. 21; and,

FIG. 24 is a bottom plan view of the pawl-lifter of FIG. 21.

DETAILED DESCRIPTION OF THE PREFERRED EMBODIMENT

Figure 3:
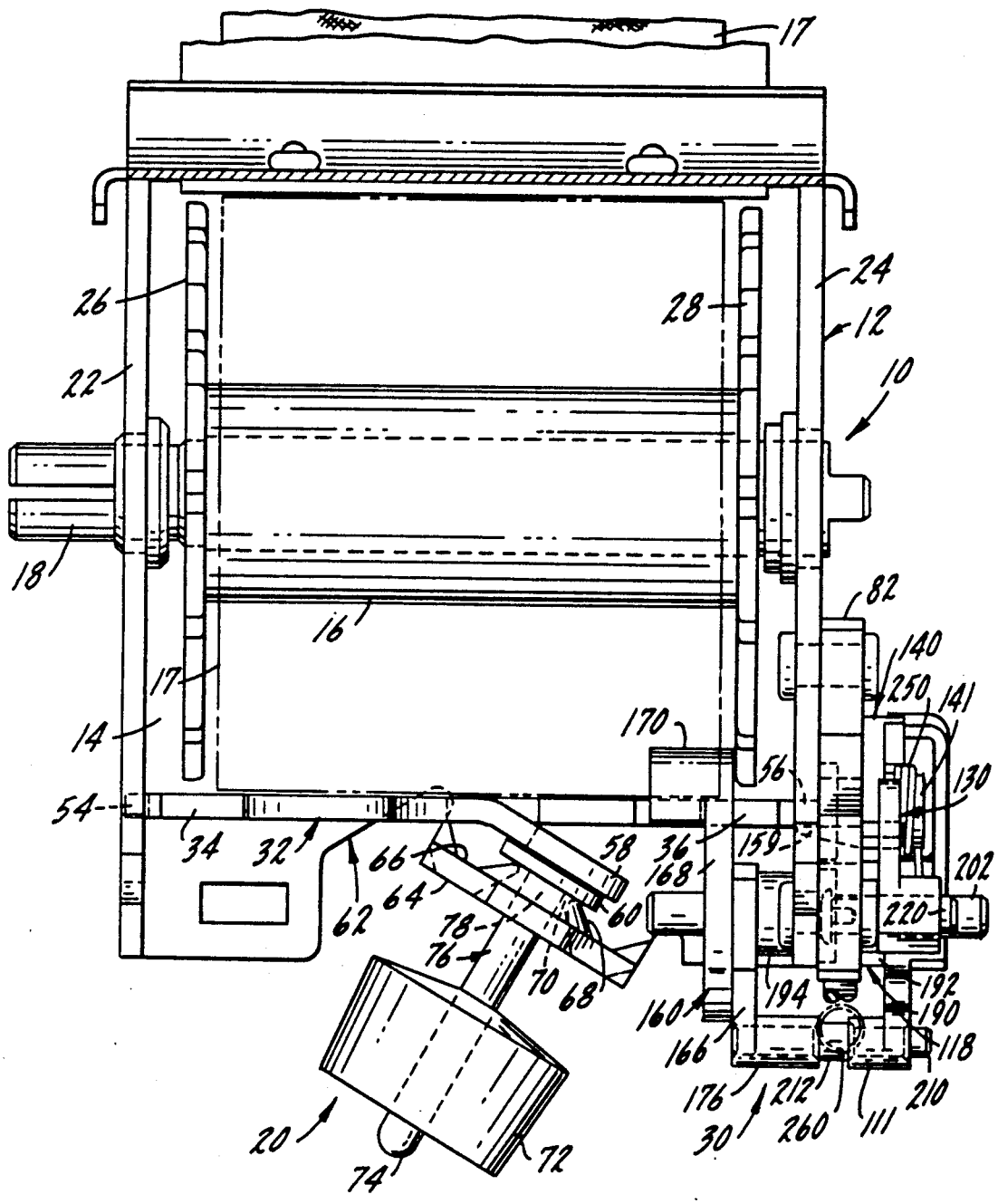
FIG. 3 is a plan view in partial section of the automatic-locking mechanism.

As shown in the drawings for purposes of illustration, the invention is embodied in a seat belt retractor which has a seat belt 17 to be positioned about an occupant. The seat belt is wound on a reel 16 and is pulled to be unwound from the reel and positioned about an occupant who is free to move about with the belt winding and unwinding from the reel during such movement. The illustrated retractor is an inertia retractor which includes an inertia-locking mechanism 20, which is operable at the time of an accident, by an inertia member or weight 72 to shift a locking pawl or lock bar 32 into locking engagement with ratchet teeth 29 on ratchet wheels 26 and 28 fixed to opposite ends of the reel. A rewind spring (not shown) is attached to the left hand end of a reel shaft 18 and exerts a biasing force to rewind the belt onto the biasing force to rewind the belt onto the reel. The protraction of the belt requires a sufficient outward pulling force to overcome the rewinding force of the rewind spring attached to the reel shaft. The reel shaft 18 is journaled for rotation in bearings in a pair of spaced, frame sidewalls 22 and 24 of a U-shaped retractor frame 15 having a central web 23 joining these sidewalls. Thus, it will be seen that the retractor is a conventional inertia retractor having a pendulum inertia weight which can be swung to pivot the lock bar to lift the latter into locking engagement with the ratchet wheel teeth 29 thereby holding the reel from unwinding and further belt extraction. When the pendulum inertia weight is not actuated, the lock bar is spaced from the ratchet wheel teeth, and the seat belt is free to be extracted against the force of the rewind spring.

In accordance with the present invention, this inertia retractor, which is a conventional and well known size, shape and manner of operation, can be converted to provide an ALR mode by the attaching of an attachment or ALR apparatus 30 to the retractor sidewall 24. The conventional inertia-operating retractor is relatively small and inexpensive; and the additional ALR attachment 30 is relatively small and is preferably mounted on one sidewall 24 of the conventional inertia retractor. The preferred attachment is formed of relatively few and inexpensive parts and is readily assembled to the retractor sidewall when it is desired to add the ALR function to the inertia retractor, and thereby provide a convertible retractor which is usable in either the inertia mode or the ALR mode.

Herein, a separate subassembly is provided with a mounting or supporting base 80 with the elements mounted thereon to convert the retractor to an ALR retractor when the mounting base 80 is secured to the right retractor frame wall 24, as seen in FIGS. 3 and 4. As will be explained in greater detail, the subassembly carried on the mounting base 80 includes a belt coil sensor 160 to sense the amount of webbing wound in a coil on the reel and when sensing a predetermined diameter to operate a deactivating means which is preferably in the form of a latch means which unlatches a latch member 120 to cause a pawl actuator means 140 to move the pawl 32 into locking engagement with the ratchet teeth 29 to lock the reel against further belt protraction. As will be explained, when the buckle is unlatched and the belt is rewound onto the reel, the belt sensor deactivates the pawl activating means by a re-latching of the pawl actuator, and the inertia weight 72 will again become effective as the retractor is converted back to its inertia-operated mode.

Turning now in greater detail to the retractor, as shown in FIGS. 1-8, seat belt retractor assembly 10 has an inertia lock system 20 and an elective automatic-locking apparatus 30, which is mounted on retractor frame sidewall 24. In the first or reference mode, seat belt 17 is secured about a passenger, and is protractible with the movement of the passenger. However, actuation of the inertia-lock engages the belt retraction mechanism and moves pawl 32 to prohibit further belt protraction. Retractor assembly 10 has frame 12 providing an enclosure 14 for seat belt 17 wound on reel apparatus 16. Shaft 18 of reel 16 extends through first and second frame sidewalls 22 and 24 with first ratchet wheel 26 and second ratchet wheel 28 secured on shaft 18 in enclosure 14. Ratchet wheels 26 and 28 have a plurality of ratchet wheel teeth 29 at the wheel perimeters for engagement by locking lever or pawl 32 to prohibit protraction of belt 17.

Locking lever or pawl 32 is illustrated as a generally flat plate with pawl ears or tips 54 and 56 inserted in pivot apertures 50 and 52, of frame sidewalls 22 and 24, respectively. Pawl 32 pivots in apertures 50 and 52 to engage ratchet teeth 29 of ratchet wheels 26 and 28 with tabs 34 and 36, which prohibits belt 17 protraction, in response to actuation by either inertia-lock means 20 or automatic-locking apparatus 30. More specifically, inertia-lock means 20 has arm 58 extending generally from pawl 32 mid-length at an acute angle. A bracket 62 is coupled to one of frame members 22, 24 and has an upright member 64 with a face 66 parallel to arm 58 of lever 32, which face 66 includes an embossment 68 generally shaped as a truncated cone and operable as a bushing for a rod 76. Passage or port 70 in upright member 64 and embossment 68 has rod 76 extending therethrough. Mass or motion-responsive inertia weight 72 is positioned at one end 74 of generally cylindrical rod 76 with a pad 60 mounted on its other end 78 to contact arm 58 of pawl 32. At sudden changes in speed of a vehicle, inertia-lock system 20 inhibits protraction of belt 17 by pivoting inertia weight 72, actuating pawl 32 to pivot in apertures 50, 52, and moving tips 34 and 36 to engage ratchet teeth 29 of ratchet wheels 26 and 28, respectively. In the Figures, cover 79 is secured to frame 12 over inertial-lock means 20 to isolate and protect this system. Cover 79 for inertia-lock system 20 is secured to assembly 10 by tabs inserted in ports 13 and 15. Similarly a cap 31 in FIG. 2 is mounted on sidewall 24 to cover and protect manual locking apparatus 30.

Figure 5:
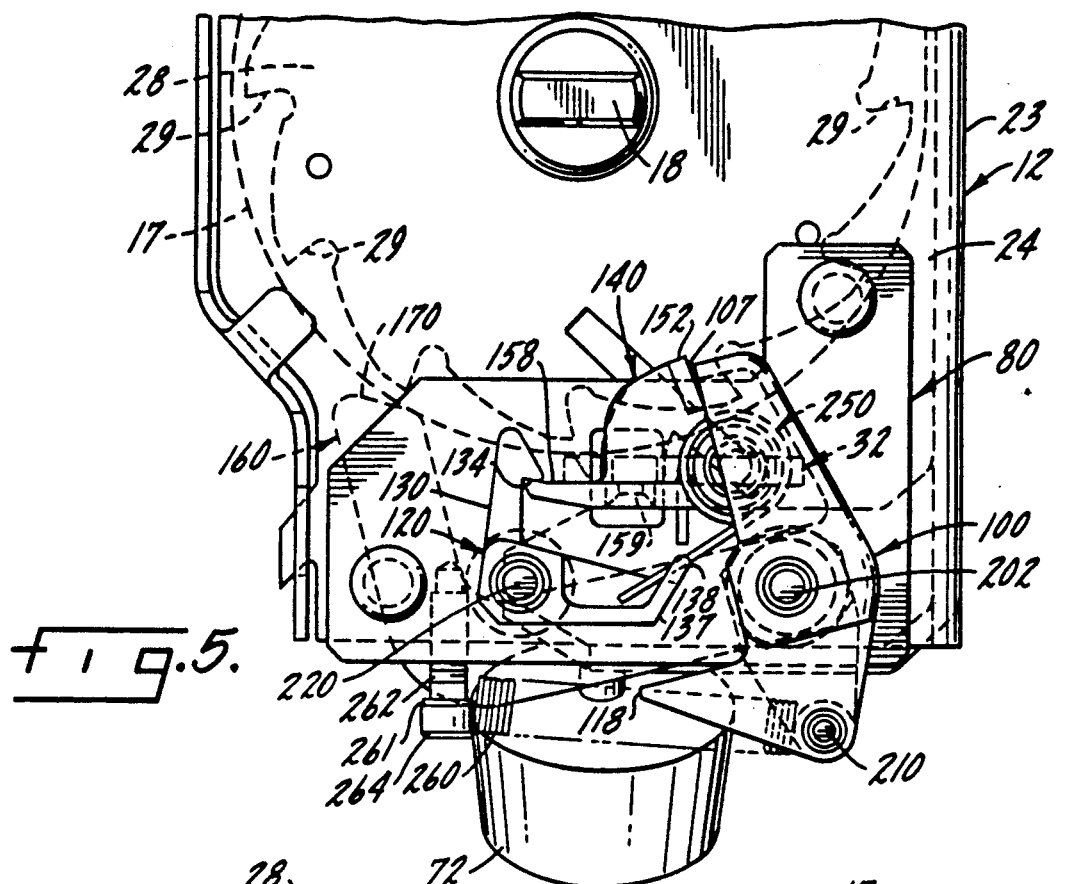
FIG. 5 is a side elevational view of the automatic-locking mechanism at a reference position.
Figure 6:
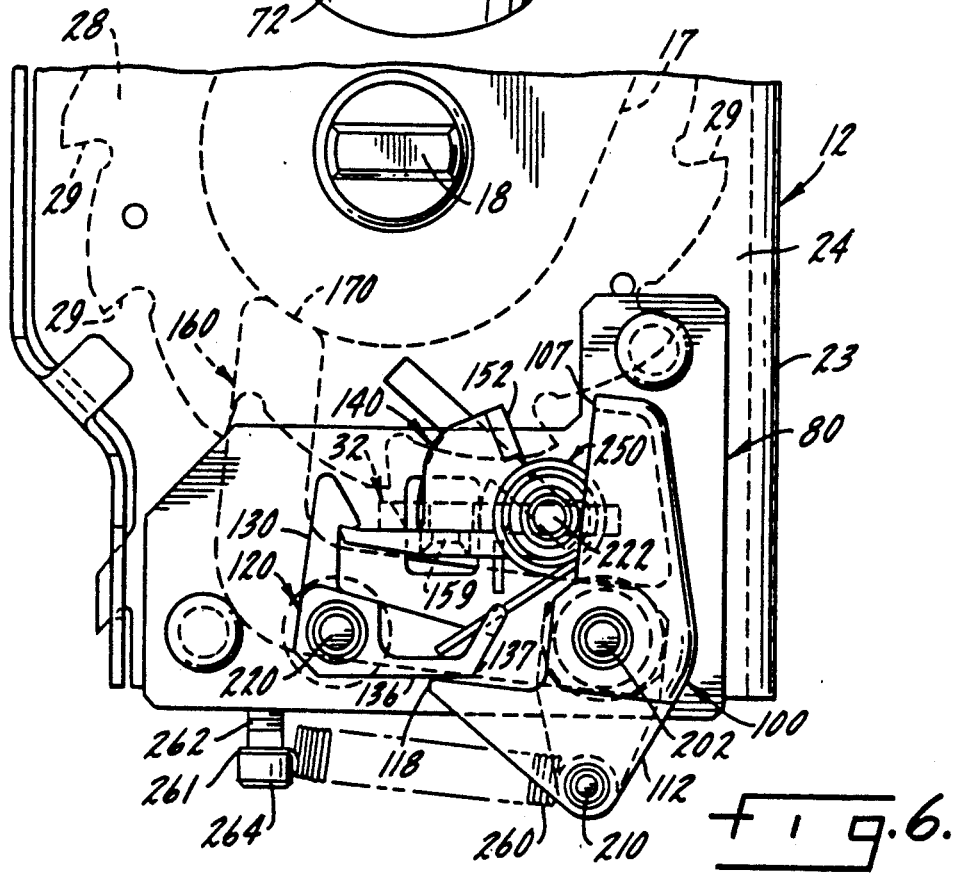
FIG. 6 is a side elevational view as in FIG. 5 with the actuator arm at initial contact with the latch lever.
Figure 7:
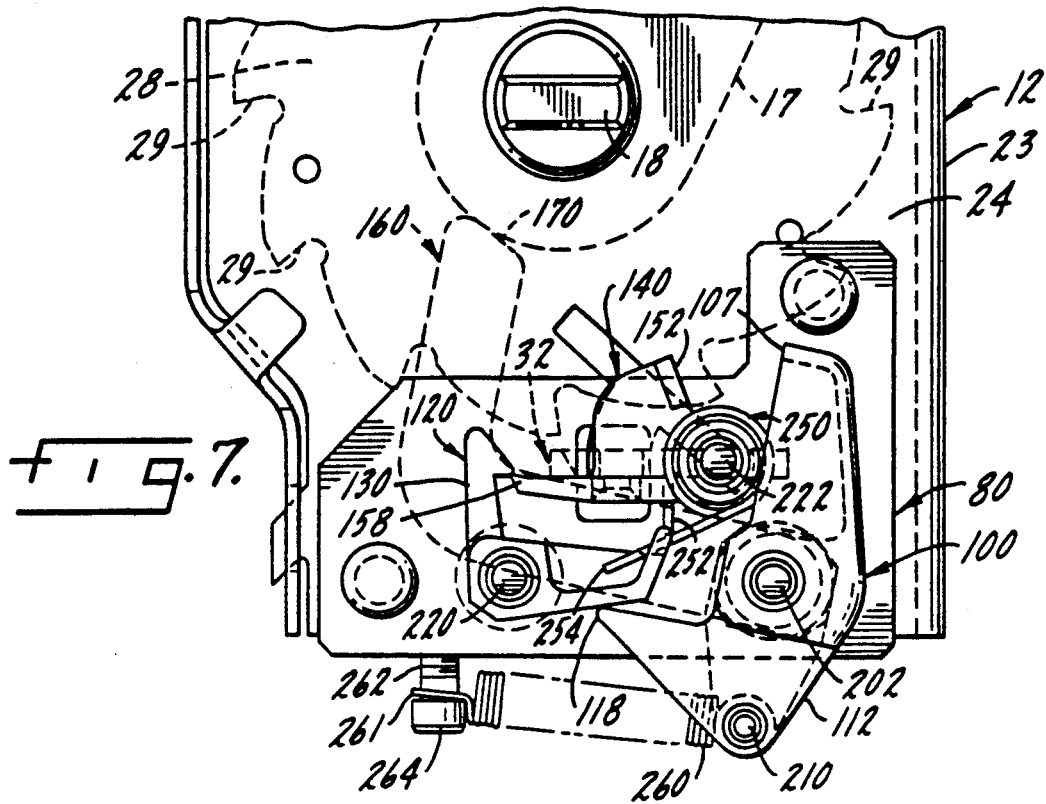
FIG. 7 is an elevational view of the automatic-locking mechanism of FIG. 5 with the pawl-lifter at incipient release from the latch lever.
Figure 8:
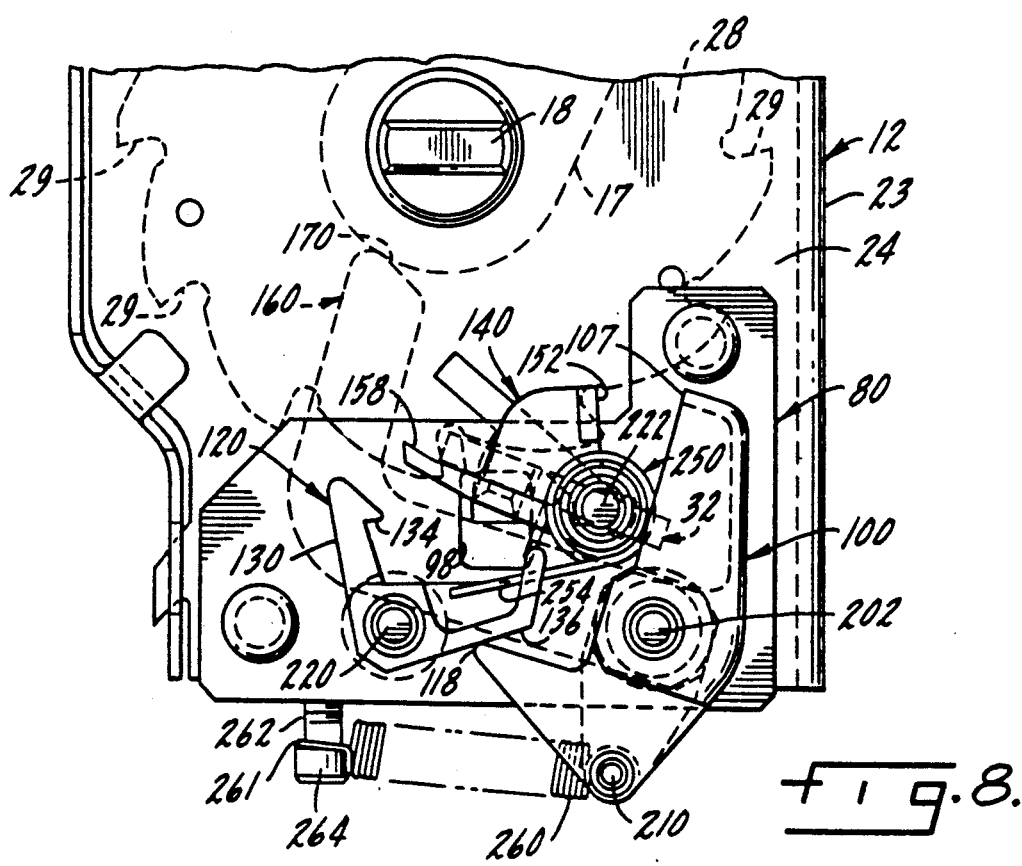
FIG. 8 is an elevational view of the automatic-locking mechanism with the pawl-lifter moving the pawl into the belt-protraction limitation position.

Automatic locking assembly 30 in FIGS. 3-6 is mounted on retractor assembly 10, and includes a support base or brace 80, an actuator arm 100, a deactivating means in the form of a latching means having a latch lever 120, a pawl actuating means in the form of a pawl-lifter 140, and a sensing means having a follower arm 160 shown in detail in FIGS. 9-24. In FIG. 5, assembly 30 is at its reference position with latch lever 120 restraining pawl-lifter 140 out of contact with pawl 32 and actuator arm 100 contacting pawl-lifter 140. Assembly 30 moves through a progression of steps in FIGS. 6-8 to an actuation position where pawl-lifter 140 has moved pawl 32 for engagement of teeth 34 and 36 with ratchet teeth 29 to prohibit belt protraction.

Support 80 of automatic-locking assembly 30 is the mounting support for the several rotating elements as well as the mounting support for affixing assembly 30 to retractor 10. In FIGS. 9-11, brace 80 has wall 82 with lower edge 83, front face 84 and rear face 86. Mounting ports 88 and 90 are generally at diagonally-opposed corners of brace front face 84 for alignment with securing ports on frame 12 to mount assembly 30 thereon. First pivot-stud bore 92 and second pivot-stud bore 94 extend through brace 80 and are normal to wall surfaces 84 and 86. Wall 82, as noted in FIGS. 3 and 4, is relatively thin and approximately the thickness of one of frame members 22 and 24, thus minimizing the width of the outwardly-extending locking assembly 30 protruding from one of frame members 22 and 24. In the preferred embodiment, recesses 91 and 93 open at rear face 86 are generally aligned with pivot-stud bores 92 and 94, respectively, and are operable as counter bores for securing means of assembly elements extending through ports 92 and 94. A blindhole bore 95 open at brace lower edge 83 extends into wall 82 parallel with and between surfaces 84 and 86. This blindhole bore 95 may be threaded to receive an anchoring means for a bias member. Pivot bore or connecting-rod port 96 provides a port for a pivot shaft 202 through wall 82, coupling actuator arm 100 and follower arm 160. Window 98 is an access port for a contacting foot operable to move locking lever 32 into an engaged position.

Actuator arm 100 in FIGS. 12-14 is pivotable on pivot shaft 202, which extends through port 96, to contact and rotate latch lever 120. Shaft 202 extends through first pivot bore 114 in central portion 108, which is generally perpendicular to body outer face 104 and inner face 106. Actuator arm lower segment 112 includes shoulder 101 extending horizontally normal from central body portion 108 with foot 118 at its terminus to contact and move latch lever 120. Actuator arm upper segment 110 has contact surface 107 at upper extremity 109 and is undercut to provide an approximately cup-shaped enclosure 105 with an inner face 103 as free-travel space for arm 100 in proximity to pawl-lifter 140. As shown in FIGS. 13 and 14, boss 111 extends from inner face 106 to provide an enlarged bushing-like arrangement with second pivot bore 116 for second pivot shaft 210.

In FIG. 5, latch lever 120 at the reference position contacts and latches pawl-lifter 140 against pivoting to bring its foot 159 to shift the pawl 32 to engage the ratchet teeth and lock the reel against turning to allow belt protraction. Latch lever 120 in FIGS. 15-18 generally has a triangular shape or outline with front face 122, rear face 124 and body segment 126 at a triangle corner having a through-bore 128 for a pivot shaft 220. Latch arm 130 vertically extends from body segment 126 and at its extremity, or second corner of the triangular shape, has latch tooth 132 with a shoulder 134 to contact and secure pawl-lifter 140 at the reference position. A second projecting arm 136 extends along the second triangle leg to the third corner and has finger 138 protruding from second arm end 137. Latch arm 130 and second projecting arm 136 are offset from central body portion 126 to provide finger 138 and latch 132 on opposite sides of a horizontal plane through body segment 126 in FIG. 15. The staggered or offset arrangement aligns the arms 130 and 136 for intermeshing and interworking with actuator arm 100 and pawl-lifter 140. That is, latch tooth 132 contacts and secures pawl-lifter 140 at the reference position and is pivotable about shaft 220 in pivot bore 92 by actuator arm foot 118 against a bias of spring 250.

Follower arm 160, which is shown in dashed outline in FIGS. 5-8, is operable as a mechanical sensing and actuating means to sense the belt position and to actuate or rotate actuator arm 100 to shift from the inertia locking mode to the automatic locking mode. In FIGS. 19 and 20, follower arm or sensing means 160 has hub portion 162 with bore 172, a lower portion 166 and a first leg 164, which extends from hub 162 at a right angle to lower portion 166. First leg 164 has an upright or contact rod 168 normally projecting from arm 164 at its distal end 165, which contact arm 168 has an upper surface 170 maintaining contact with safety belt 17. Shaft 210 is coupled between follower arm second bore 174 at lower extremity 176 of lower segment 166 and actuator arm second pivot bore 116. Follower arm 160 is mounted and pivotable on shaft 202 in hub bore 172, which shaft 202 extends through port 96 from actuator arm 100, as upper surface 170 continues to contact belt 17 during its protraction. Follower bushing 190 with annular surface 192 and generally cylindrical portion 194 is matable with connecting rod port 96 of support 80 and has shaft 202 extending therethrough. As noted in FIGS. 3-8, lower or second pivot shaft 210 does not extend through support member 80 but couples the boss or bearing bores of actuator arm 100 and follower arm 160, which actuator arm 100 and follower arm 160 are independently pivotable on pivot shaft 202 and are coupled to operate in unison by shaft 210.

When the belt is fully unwound from the reel, the sensing lever 160 unlatches the latch lever 120 to allow the previously latched pawl lifter 140 to rotate by the bias of spring 250, which is wound about shaft 222, to engage and move pawl 32 by foot 159 to lock reel 16 against further belt protraction. Pawl-lifter 140 in FIGS. 21-24 also has a generally triangular shape or outline. Hub 141 with pivot passage 142 at one of the corners or angles of the triangle has a first lifter leg 144 and a second lifter leg 146 with lower surface 145. First lifter leg 144 has outer face 148 and inner face 150 with upper or contacting pad 152 at extremity 154 and extends from hub 141 at an acute angle to second leg 146. Contacting pad 152 is engagable by actuator arm surface 107 to return pawl-lifter 140 to the reference position. Second lifter leg 146 in FIG. 21 extends from hub 141 in approximately a horizontal plane with through-port or anchoring passage 156 for an end of spring 250 about normal to lower surface 145 and in proximity to pivot aperture 142. An extremity 158 for grasping by latch lever shoulder 134 is upwardly bent at an acute angle from lower surface 145. As pawl-lifter 140 rotates on shaft 222, foot or sill 159, which extends approximately normally from second leg inner face 150 through window 98, is operable to contact and lift pawl 32 into engagement with ratchet wheels 26 and 28 to secure belt 17 against further protraction from reel 16.

The interrelationship and orientation of the several elements of automatic-locking apparatus 30 are shown in FIGS. 3–8. The pawl actuating means to shift the pawl into locking engagement with the ratchet wheels preferably includes the pawl-lifter 140 which is mounted on lifter post 222 extending through bore 94 with lifter face 150 in proximity to support outer surface 84 and with foot 159 extending through and movable in support window 98 to engage pawl 32. Inner surface 106 of actuator-arm 100 abuts bushing 190 and is displaced from support surface 84 allowing receipt of pawl-lifter hub 141 in actuator-arm recess 105. As shown in FIG. 5 at the reference position of assembly 30, actuator-arm contact surface 107 contacts pad 152 of pawl-lifter 140, latch lever 120 is pivotable on mounting pin 220 and biased to secure pawl-lifter 140, and the coupled components are individually and sequentially rotatable for cooperative action in response to changes in belt position sensed by follower arm 160.

First bias spring 250 in FIGS. 5–8 is looped or wound about hub 141 of pawl-lifter 140, with a first end 252 extending through-hole 156 and a second end 254 contacting and protruding beyond projecting arm 136 of latch lever 120. In the reference position, spiral spring 250 biases latch lever 120 to engage slanted surface or extremity 158 of pawl-lifter 140 with shoulder 134, which maintains pawl-lifter 140 disengaged from pawl 32. Second biasing means or spring 260 in FIGS. 5–8, is operable to bias actuator arm 100 toward contact of foot 118 with second arm 136 of latch lever 120. Spring 260 is coupled between bearing surface 212 of second pivot pin 210 and a locking or securing means 262, which is illustrated as a threaded screw with extended head 264 with coiled or hooked end 261 secured thereto.

Inertia-lock system 20, as noted above, may be activated by a sudden change in the speed of a vehicle, which moves inertia mass 72 to actuate pawl 32 to engage ratchet wheels 26 and 28 to restrict further protraction of belt 17 from reel assembly 12. However, auto-lock apparatus 30 is electively operable to move pawl 32 to engage pawl tabs 34 and 36 with teeth 29 of reel wheels 26 and 28 to restrict protraction of belt 17. Auto-lock system 30 is actuated by complete withdrawal of belt 17 from reel 16 with belt follower or second sensing means 160 following the diameter of the coil of belt 17 on the reel Sensing means 160 is biased by second bias spring 260 to maintain its upper surface 170 in contact with belt 17 as the belt radius is reduced to approximately the diameter of reel shaft 16.

In order to deactivate the assembly 30 by placing it into the latched position shown in FIG. 5, the belt 17 is wound on reel 16 and the follower arm 160 pivots actuator arm 100 on shaft 202 with second pivot shaft 210 to contact pawl-lifter 140 as the belt is being fully wound. In this reference or pawl-lifter disengaged position, actuator-arm contact surface 107 engages pawl-lifter contacting pad 152 to rotate pawl-lifter 140 counterclockwise in FIGS. 5–8 against bias spring 250. Simultaneously, latch lever 120 is rotated clockwise on mounting pin 220 through the connection of spring 250 between pawl-lifter 140 and latch lever 120 until latch shoulder 134 engages pawl-lifter extremity 158 to secure pawl-lifter 140 at the reference position.

Actuation of auto-lock system 30 by full protraction of belt 17 with continual contact between follower arm 160 and the belt surface rotates arm 160 about pivot shaft 202. Actuator arm 100 is simultaneously pivoted on shaft 202 to move foot 118 to contact second projecting arm 136 of latch lever 120 (cf. FIG. 6) and pivots latch lever 120 about pin 220 against the bias force of spring means 250. Disengagement of latch-lever shoulder 134 from pawl-lifter extremity 158 (cf. FIGS. 7 and 8) releases pawl-lifter 140 and allows its rotation about lifter post 222 in response to the biasing force of spring 250. Thereafter, foot or sill 159, which extends through window 98, contacts and pivots pawl 32 for engagement of teeth 29 of reel wheels 26 and 28 by tabs 34 and 36 to inhibit further protraction of belt 17 from reel 16. It will be appreciated that after full unwinding of the belt and operation of the pawl lifter to lift the pawls, that the reel is still free to rewind belt onto the reel with the ratchet teeth merely sliding past the pawl tabs 34 and 36, as the reel turns clockwise as viewed in FIG. 8. Thus, the belt can be rewound to take up any slack and to tightly cinch itself to the person or to the baby seat or object, and the pawl will remain in the FIG. 8 locking position until the buckle is released to allow a complete rewinding of the belt onto the reel.

While only a specific embodiment of the invention has been described and shown, it is apparent that various alternatives and modifications can be made therein. It is, therefore, the intention in the appended claims to cover all such modifications and alterations as may fall within the scope and spirit of the invention.

What is claimed Is:

1. A retractor having an inertial-operable lock system and mode of operation and an addition thereto that adds an automatic locking (ALR) mode thereto, said retractor comprising:

a frame having a pair of spaced sidewalls, a reel rotatably mounted on the frame and having a seat belt wound in a coil thereon and biased to turn in the belt rewind direction to rewind the belt onto the reel, ratchet wheels connected to the reel, a pivotally mounted pawl mounted on the frame for shifting from a released position spaced from the ratchet wheels to a locking position in which the pawl engages the ratchet wheels and locks the reel against further rotation in a direction to extend the belt, an inertia member mounted on the frame and movable relative thereto in response to a predetermined deceleration to shift the pawl into its locking position with the ratchet wheels, and a convertible assembly for attachment to one of the sidewalls of the frame to add the ALR mode to the retractor, the convertible assembly including a mounting base secured to a first sidewall of said frame, a belt sensor mounted on the base and projecting therefrom to engage and sense the diameter of the belt coil thereon, a pawl actuating means on the base for actuating the pawl into engagement with the ratchet wheels independently of the inertia member, the belt sensor being operable upon sensing the belt having been unwound from the coil to a predetermined extent, and deactivating means mounted on the base for deactivating the pawl actuating means and operable by the belt sensor sensing that the belt is wound in a coil of a predetermined diameter to prevent the pawl actuating means from shifting the pawl into its locking position.

2. A retractor in accordance with claim 1 in which the frame is a U-shaped frame having a central web joining the pair of spaced sidewalls, said mounting base being secured to be flush against the first frame sidewall, openings in the base and openings in the first sidewall being aligned, and the belt sensor having a projecting means for projecting through the aligned openings from inside of the U-shaped frame to the pawl actuator means mounted outside of the retractor frame.

3. A retractor in accordance with claim 1 in which the deactivating means comprises a latch means for latching the pawl actuating means in a position where it cannot actuate the pawl.

4. A retractor in accordance with claim 3 in which the pawl actuating means includes a pawl lifter pivotally mounted to engage and lift the pawl into engagement with the ratchet wheels, and further includes a biasing means to bias the pawl lifter to rotate and lift the pawl when the pawl lifter is unlatched.

5. A manually selectable, automatic-locking system for a seat belt retractor having an inertia-lock system, said retractor having a frame and a spring-biased reel with ratchet wheels for winding a seat belt thereon, said inertia-lock system having a motion-sensitive, inertia member and a locking pawl engagable with said ratchet wheels, which locking pawl in a first operating mode is actuable by said inertia member to prohibit protraction of said belt from said reel, said automatic-locking system comprising:
- a subassembly attachable and retrofittable to said frame to incorporate an automatic-locking and second operating mode in said retractor, said subassembly having
- means for sensing the reel-wound belt diameter,
- means for connecting and
- means for actuating said locking pawl independently from said inertia-lock system means coupled to said sensing means by said connecting means, which actuating means is responsive at a sensed predetermined reel-wound belt diameter to move said locking pawl into engagement with said ratchet wheels to prohibit belt protraction in said second operating mode.

6. An automatic-locking system as claimed in claim 5, wherein said frame has a sidewall defining an enclosure with said reel and ratchet wheels positioned in said enclosures; said sensing means operable in said enclosure and having at least one extending segment protruding outside said enclosure and coupled by said connecting means to said actuating means outside said sidewall.

7. An automatic-locking system as claimed in claim 6 wherein said sensing means is an elongate and pivotal follower arm with at lest one extending segment protruding from said enclosure;
- a first pivot shaft with a first end and a second end extendings through said sidewall into said enclosure;
- said follower arm pivotally mounted on one of said first and second shaft ends in said enclosure;
- said actuating means has an actuator arm, and is pivotally mounted on the other of said first and second shaft ends;
- said coupling means connected between said actuating arm and follower arm protruding segment, said coupling means operable to pivot said actuating arm on said first shaft in response to pivoting of said follower arm to engage said actuation means and locking pawl to prohibit belt protraction from said reel.

8. An automatic-locking system as claimed in claim 7, wherein said sensing means is pivotal on said first shaft to sense a fully wound belt diameter on said reel, and pivot said actuator arm to disengage said actuating means from contact with said locking pawl and reset said automatic-locking system to said first-operating mode and, simultaneously disengage said automatic locking system and said second operating mode.

9. An automatic-locking system as claimed in claim 7 wherein said means for locking is a pawl with a first tab and a second tab, which pawl is mounted and pivotal in said frame;
- each of said first and second ratchet wheels having a perimeter with a plurality of teeth;
- said pawl operable by said actuating means to pivot said tabs to engage said ratchet teeth and prohibit belt protraction.

10. An automatic-locking system as claimed in claim 9, further comprising said frame having a plurality of passages;
- a support with an outer face and a plurality of openings, said support mounted and secured on said frame, each of said frame passages alignable with a support opening;
- said coupling means being a second pivot shaft;
- said actuator arm pivotally mounted on said first pivot shaft at said support outer face and coupled to said follower arm by said second pivot shaft,
- a first bushing mounted on said support and having a first bushing shaft extending therefrom,
- a pawl-lifter having a pawl-contacting sill, which pawl-lifter is pivotally mounted on said first bushing shaft with said sill extending through an aligned frame passage and support opening to contact said pawl; and,
- a second bushing mounted on said support and having a second bushing shaft extending therefrom; and,
- a latch lever pivotally mounted on said second bushing shaft, which latch lever at said first operating mode and reference position is operable to engage and retain said pawl-lifter disengaged from said pawl.

11. An automatic-locking system as claimed in claim 10 wherein said actuator arm has a generally centrally-located hub and a foot extending from said hub;
- said foot rotatable with said actuator arm to contact and rotate said latch lever from said reference position at said first operating mode to release said pawl-lifter for engagement of said locking means.

12. An automatic-locking system as claimed in claim 11 further comprises:
- first means for biasing coupled between said support and said actuator arm to bias said actuator arm to said reference position and first operating mode;
- second means for biasing operable between said locking lever and said pawl lifter to bias said pawl-lifter to engage said locking means;
- said means for sensing operable to move said actuator arm to contact and rotate said latch-lever from said reference position for disengaging said pawl-lifter, and said second biasing means biasing said disengaged pawl-lifter and foot to contact and move said locking means to engage said ratchet wheel teeth to restrict protraction of said seat belt.

13. An automatic-locking system for a seat belt retractor assembly as claimed in claim 12 further comprising an actuator arm projection;

said latch lever having an extending leg and a mounting aperture, said latch lever operable between a pawl-lifter inoperative mode to secure said pawl-lifter at the reference position and a pawl-lifter released position, which released pawl-lifter is biased by said second biasing means to rotate and to contact an move said locking means to secure said belt against protraction from said reel.

14. An automatic-locking system as claimed in claim 13 wherein said latch lever has a latch-lever shoulder;

said pawl-lifter having a lip and a crossbore for rotational mounting of said pawl-lifter on said lifter post; and, said latch-lever shoulder engagable with said pawl-lifter lip to secure said pawl-lifter in said reference position.

15. An automatic-locking system as claimed in claim 14 wherein said follower arm has an extending boss and a central bore for mounting and pivoted rotation on said first pivot shaft; said follower arm connected to said actuator arm by said second pivot shaft at said extending boss to rotate said actuator arm projection about said first pivot shaft to contact and rotate said latch lever about said mounting pin and release of said latch-lever shoulder from said pawl-lifter; and said second bias means operable to rotate said disengaged pawl-lifter to contact and move said locking means to secure said belt against protraction position.

16. An automatic-locking system as claimed in claim 14 wherein said pawl has a first pawl ear and a second pawl ear;

said frame having a first sidewall and a second sidewall, each of said first and second sidewalls having a pivot notch;

one of said first and second pawl ears extending into one of said first and second frame pivot notches, and the other of first and second ears extending into the other of said first and second pivot notches;

said pawl pivotal on said ears by said pawl-lifter sill in said second operating mode to move said first and second tabs to engage said first and second reel wheel teeth and secure said belt against protraction.

17. An automatic-locking system as claimed in claim 12 wherein said support has a first end, a second end, a lower surface generally parallel to said second pivot shaft, and a blindhole threaded bore open at said lower surface;

a protruding pillar positioned in and extending from said blindhole bore; and, said second biasing means being a coil spring coupled between said pillar and said second pivot shaft to bias said actuator arm to rotate on said pivot shaft and contact said latch lever.

* * * * *

UNITED STATES PATENT AND TRADEMARK OFFICE
CERTIFICATE OF CORRECTION

PATENT NO. : 5,037,038
DATED : August 6, 1991
INVENTOR(S) : Zygutis, et al.

It is certified that error appears in the above-identified patent and that said Letters Patent is hereby corrected as shown below:

Column 1, Line 58, change "4,519,132" to --4,518,132--.

Column 4, Lines 63-64, after "ports" delete "13 and 15".

Column 6, Line 46, change "!59" to --159--.

Column 6, Line 56, change "!40" to --140--.

Column 7, Line 22, after "extending" insert --through--.

Column 7, Line 47, after "reel" insert --.-- (period).

Column 7, Line 50, delete "shaft".

UNITED STATES PATENT AND TRADEMARK OFFICE
CERTIFICATE OF CORRECTION

PATENT NO. : 5,037,038
DATED : August 6, 1991
INVENTOR(S) : Zygutis, et al.

It is certified that error appears in the above-identified patent and that said Letters Patent is hereby corrected as shown below:

IN THE CLAIMS:

Column 9, Line 54, change "lest" to --least--.

Column 11, Line 10, change "an" to --and--.

Signed and Sealed this

Fifteenth Day of December, 1992

Attest:

DOUGLAS B. COMER

*Attesting Officer*   *Acting Commissioner of Patents and Trademarks*